United States Patent [19]

Novack et al.

[11] Patent Number: 5,005,413
[45] Date of Patent: Apr. 9, 1991

[54] ACCELEROMETER WITH COPLANAR PUSH-PULL FORCE TRANSDUCERS

[75] Inventors: Mitchell J. Novack, Kirkland; Brian L. Norling, Mill Creek; James R. Woodruff, Redmond, all of Wash.

[73] Assignee: Sundstrand Data Control, Inc., Redmond, Wash.

[21] Appl. No.: 316,399

[22] Filed: Feb. 27, 1989

[51] Int. Cl.⁵ ............................................. G01P 15/10
[52] U.S. Cl. ............................................... 73/517 AV
[58] Field of Search ....... 73/517 AV, 517 R, DIG. 1; 310/329; 338/5, 46

[56] References Cited

U.S. PATENT DOCUMENTS 4,215,570  8/1980  Eer Nisse .
4,221,131  9/1980  Albert .
4,372,173  2/1983  Eer Nisse et al. .
4,457,651  8/1984  Peters et al. .
4,488,445 12/1984  Aske ................................. 73/517 R
4,718,275  1/1988  Norling ......................... 73/517 AV
4,793,194 12/1988  Wilner ................................... 338/5
4,848,157  7/1989  Kobayashi ....................... 73/517 R
4,879,914 11/1989  Norling ......................... 73/517 AV Primary Examiner—John Chapman
Attorney, Agent, or Firm—Michael S. Yatsko

[57] ABSTRACT

A push-pull accelerometer in which both force transducers lie in a common plane. Thus, when implemented in silicon micromachined device, both transducers can be fabricated from a single crystal layer, thereby producing transducers with closely matched common mode responses.

12 Claims, 3 Drawing Sheets

ACCELEROMETER WITH COPLANAR PUSH-PULL FORCE TRANSDUCERS

FIELD OF THE INVENTION

The present invention relates to accelerometers and, in particular, to an accelerometer in which a pair of force transducers are arranged in a push-pull configuration.

BACKGROUND OF THE INVENTION

Vibrating beam force transducers are often used as force-to-frequency converters in accelerometers and other instruments. In one known arrangement, the transducers are used in push-pull pairs in which a given acceleration results in a compression force on one transducer and a tension force on the other transducer. This mode of operation provides a high degree of compensation for many common mode errors, i.e., errors that cause the frequencies of the transducers to shift by the same amount in the same direction, because the shifts cancel in the algorithms normally used to process the transducer outputs. Such errors include vibration rectification errors, errors induced by temperature change, most aging errors, and measurement errors induced by a drift in the clock frequency. To optimize the performance of an accelerometer of this type, it is important for the force transducers to have nearly identical common mode responses.

In recent years, techniques have been developed for fabricating accelerometers from silicon crystals, using micromachining techniques that are similar to those used to create integrated circuits. In an accelerometer to be fabricated using micromachining techniques in silicon, the most straightforward way to create a push-pull accelerometer would be to form one force transducer from the upper surface of the silicon wafer, form the other transducer from the lower surface of the wafer, with the hinge axis of the proof mass positioned somewhere between the transducers. In such an arrangement, rotation of the proof mass about the hinge axis will put one transducer in compression, and the other transducer in tension. The problem with this technique is that the two transducers are formed from different physical layers of the crystal. The two transducers will therefore in general not have well-matched common mode responses.

The problems described above are typical for transducers other than vibrating beam transducers, including surface acoustic wave transducers, metallic strain gauges, and piezoresistive and piezoelectric strain gauges. In some cases, these other transducer types introduce additional common mode problems, such as pyroelectric effects in piezoelectric strain gauges.

SUMMARY OF THE INVENTION

The present invention provides a push-pull accelerometer in which both force transducers lie in a common plane. Thus, when the present invention is implemented in a silicon micromachined device, both force transducers can be fabricated from a single layer, thereby producing a pair of transducers with closely matched common mode responses. The invention is preferably implemented in a pendulous accelerometer that includes means for mounting the proof mass for rotational movement about a hinge axis in response to acceleration along a sensitive axis. The hinge axis is normal to the sensitive axis, and is parallel to but spaced from the common plane containing the force transducers.

DETAILED DESCRIPTION OF THE INVENTION

Figure 1:
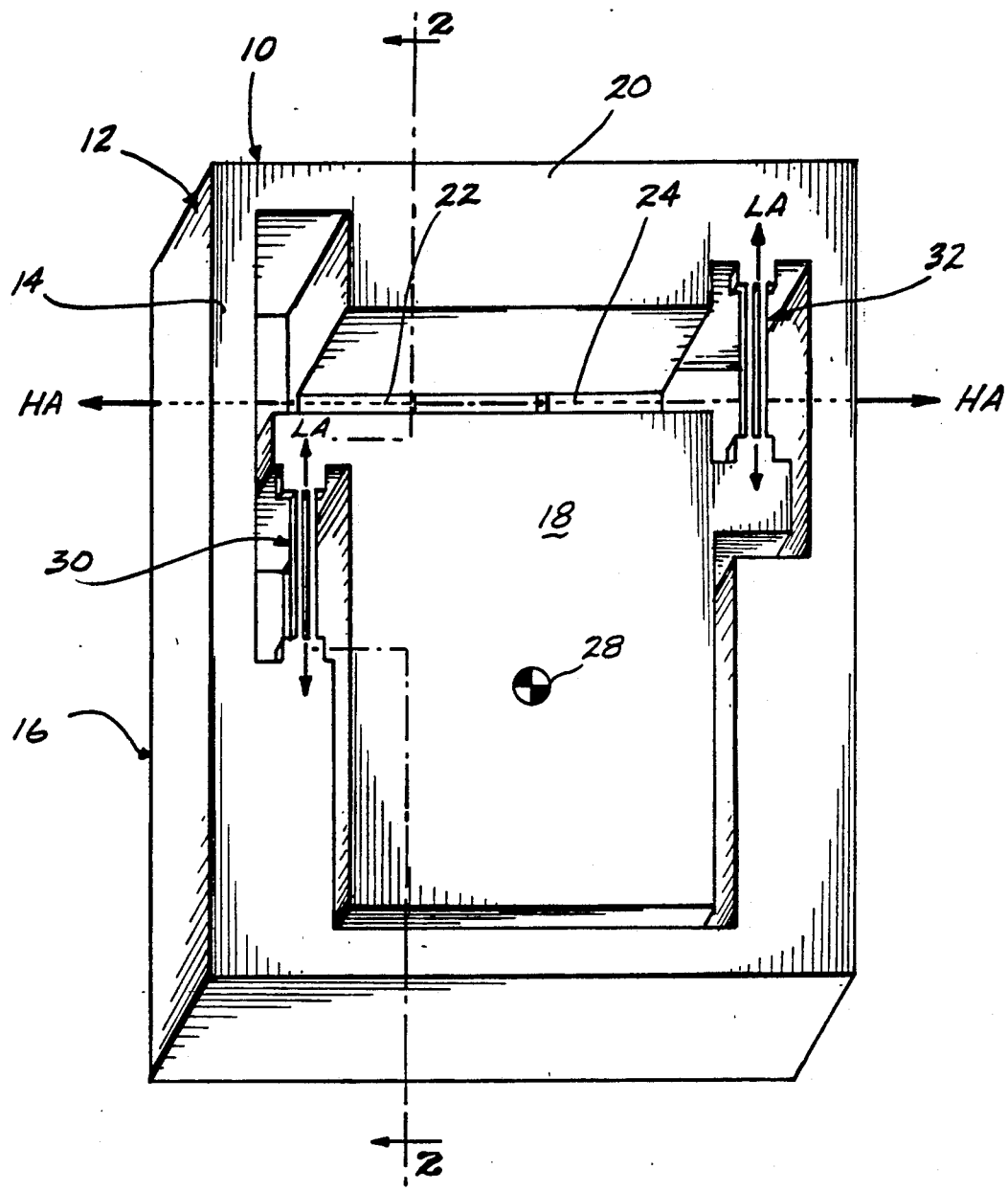
FIG. 1 is a schematic, perspective view of a first preferred embodiment of the accelerometer of the present invention.
Figure 2:
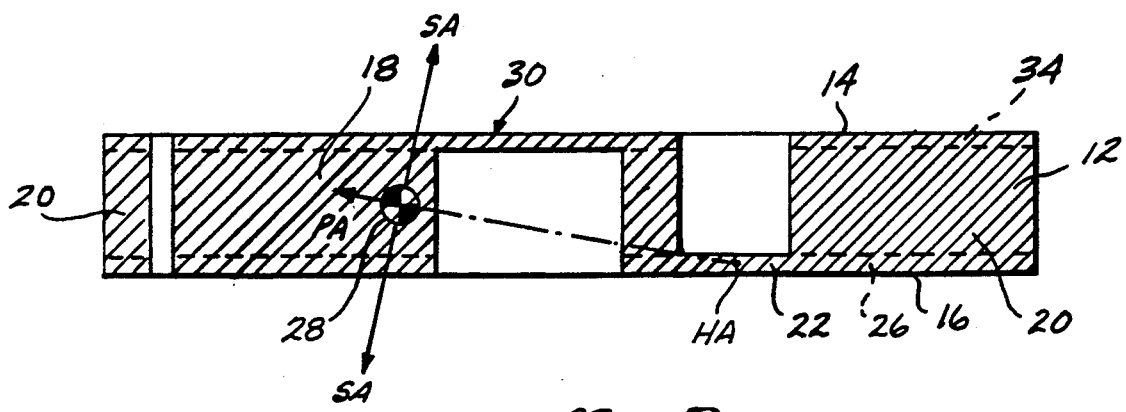
FIG. 2 is a cross-sectional view taken along the line 2—2 of FIG. 1.

FIGS. 1 and 2 show a first preferred embodiment of the accelerometer of the present invention. The accelerometer 10 is preferably formed from a single wafer 12 of silicon, the wafer including an upper surface 14 and a lower surface 16. The wafer is etched so as to form proof mass 18 that is attached to support 20 by a pair of flexures 22 and 24, the flexures being formed in layer 26 at lower surface 16, as described below. The flexures permit the proof mass to rotate with respect to the support about a hinge axis HA that passes through the centers of the flexures, and that lies in layer 26. The accelerometer thus has a pendulous axis PA that is normal to the hinge axis and that passes through center of mass 28 of proof mass 20. The accelerometer measures acceleration along a sensitive axis SA that is normal to the hinge and pendulous axes.

The accelerometer shown in FIGS. 1 and 2 includes force transducers 30 and 32 connected between the proof mass and the support. Both force transducers are formed in layer 34, at upper surface 14 of wafer 12. The force transducers are illustrated as being of the double-ended tuning fork vibrating beam type, wherein a pair of beams are caused to oscillate, in the plane of the beams, 180° out of phase with one another. For each transducer, the beams are parallel to a longitudinal transducer axis (LA) that defines the sensitive direction of the transducer. For each transducer, a tension force along its longitudinal axis increases the resonant frequency, while a compression force along its longitudinal axis decreases the resonant frequency.

Force transducers 30 and 32 are approximately parallel to pendulous axis PA. Transducer 30 extends from its point of connection to the proof mass, to its point of connection to the support, in one direction along the pendulous axis, while force transducer 32 extends from its point of connection to the proof mass, to its point of connection to the support, in the opposite direction along the pendulous axis. This arrangement results in push-pull operation, wherein for a given direction of acceleration along sensitive axis SA, one force transducer is subjected to a tension force, while the other force transducer is subjected to a compression force. It will be noted that the arrangement of FIG. 1 does not result in undesirable torques on the proof mass, because each force transducer applies a force in the same direction to the proof mass.

The accelerometer shown in FIGS. 1 and 2 can be fabricated in a number of ways, using well known silicon micromachining techniques. By way of example, wafer 12 could be a P-type wafer with surfaces oriented along 100 crystal planes. An N-type epitaxial layer 34 can then be grown on upper surface 14, and a second N-type epitaxial layer 26 can be grown on lower surface 16. The wafer can then be etched, to form the illustrated structure, with electrochemical etch stops being used to prevent etching of force transducers 30 and 32 from epitaxial layer 34, and flexures 22 and 24 from epitaxial layer 26, while deep etching of the bulk silicon is being performed.

Figure 3:
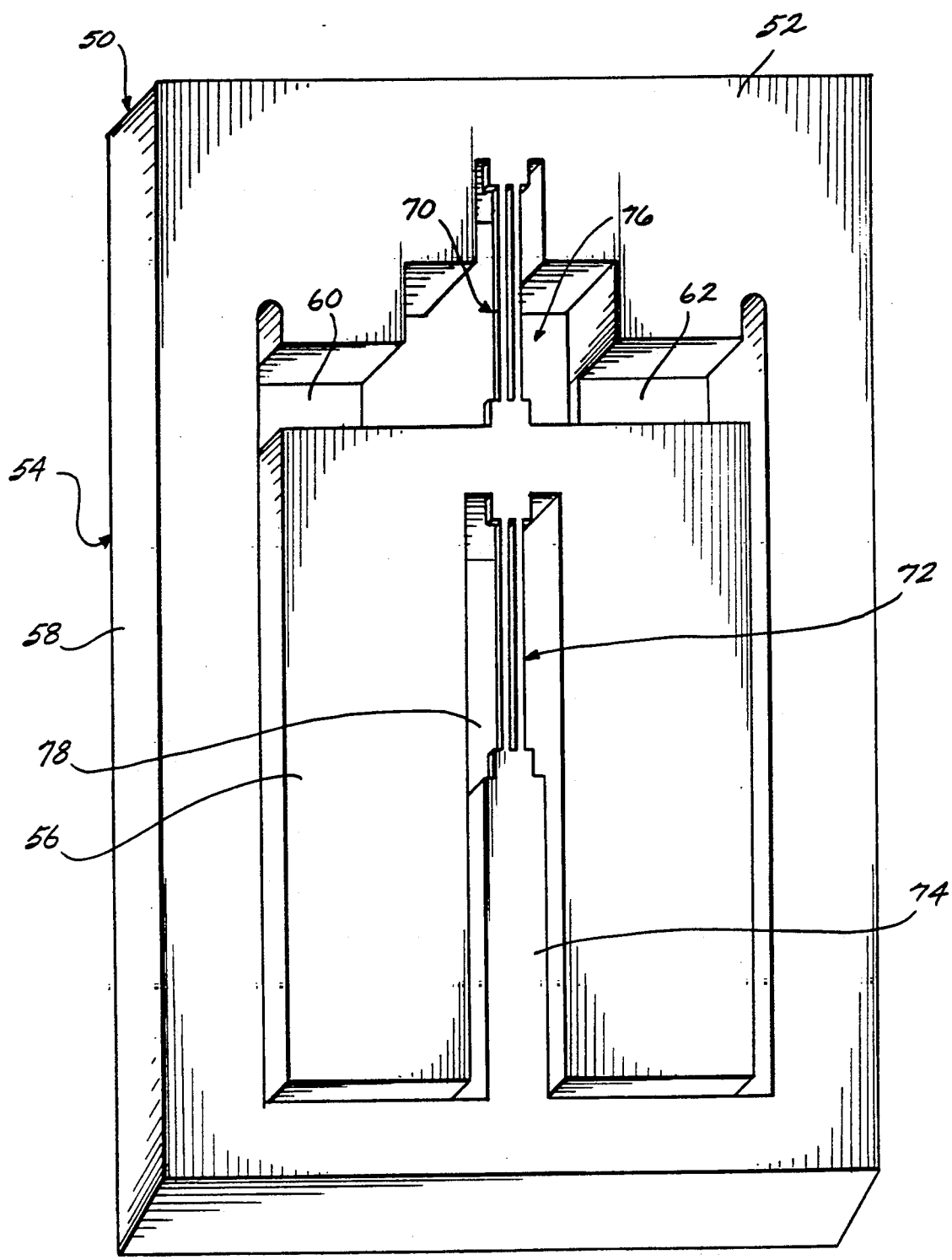
FIG. 3 is a schematic perspective view of a second preferred embodiment of the invention.

A second preferred embodiment of the invention is illustrated in FIG. 3. This embodiment comprises silicon wafer 50 having upper surface 52 and lower surface 54, the wafer being etched so as to form proof mass 56 connected to support 58 by flexures 60 and 62. Vibrating beam force transducers 70 and 72 are connected between the proof mass and the support in a push-pull arrangement. As in the embodiment of FIGS. 1 and 2, force transducers 70 and 72 are both formed at upper surface 52 of wafer 50, to provide improved common mode matching.

In the embodiment shown in FIG. 3, support 58 includes arm 74 and cut-out section 76, and proof mass 56 includes cut-out section 78. Force transducers 70 and 72 both lie along a common central axis of the structure, generally parallel to the pendulous axis of proof mass 56. Force transducer 70 extends over cut-out section 76, while force transducer 72 extends over a portion of cut-out section 78, between the proof mass and arm 74. Thus the force transducers extend from their connection points to the proof mass, in opposite directions along the pendulous axis, to thereby produce a push-pull arrangement.

The configuration shown in FIG. 3 has the advantage that the force transducers are relatively close to one another, thereby simplifying the accelerometer design for certain drive arrangements (e.g., magnetic drive). By way of contrast, in a magnetic drive system, the embodiment of FIG. 1 would require the generation of two separate magnetic fields, or a very large magnetic field. However, the close proximity of the force transducers in the FIG. 3 embodiment may at times be a disadvantage, because it may produce lock-in due to mechanical, acoustical, or electromagnetic coupling between the transducers. Another disadvantage of the FIG. 3 arrangement, in contrast to the arrangement of FIG. 1, is that the potential damping area of the proof mass is roughly cut in half by cut-out section 78, resulting in a decrease in the squeeze film damping capability of the instrument by a factor much greater than two. The arrangement shown in FIG. 1, on the other hand, produces a large usable damping area, and minimizes lock-in between the transducers, because of the large separation between them. However, the FIG. 1 arrangement has a greater common mode sensitivity to cross-axis acceleration.

Figure 4:
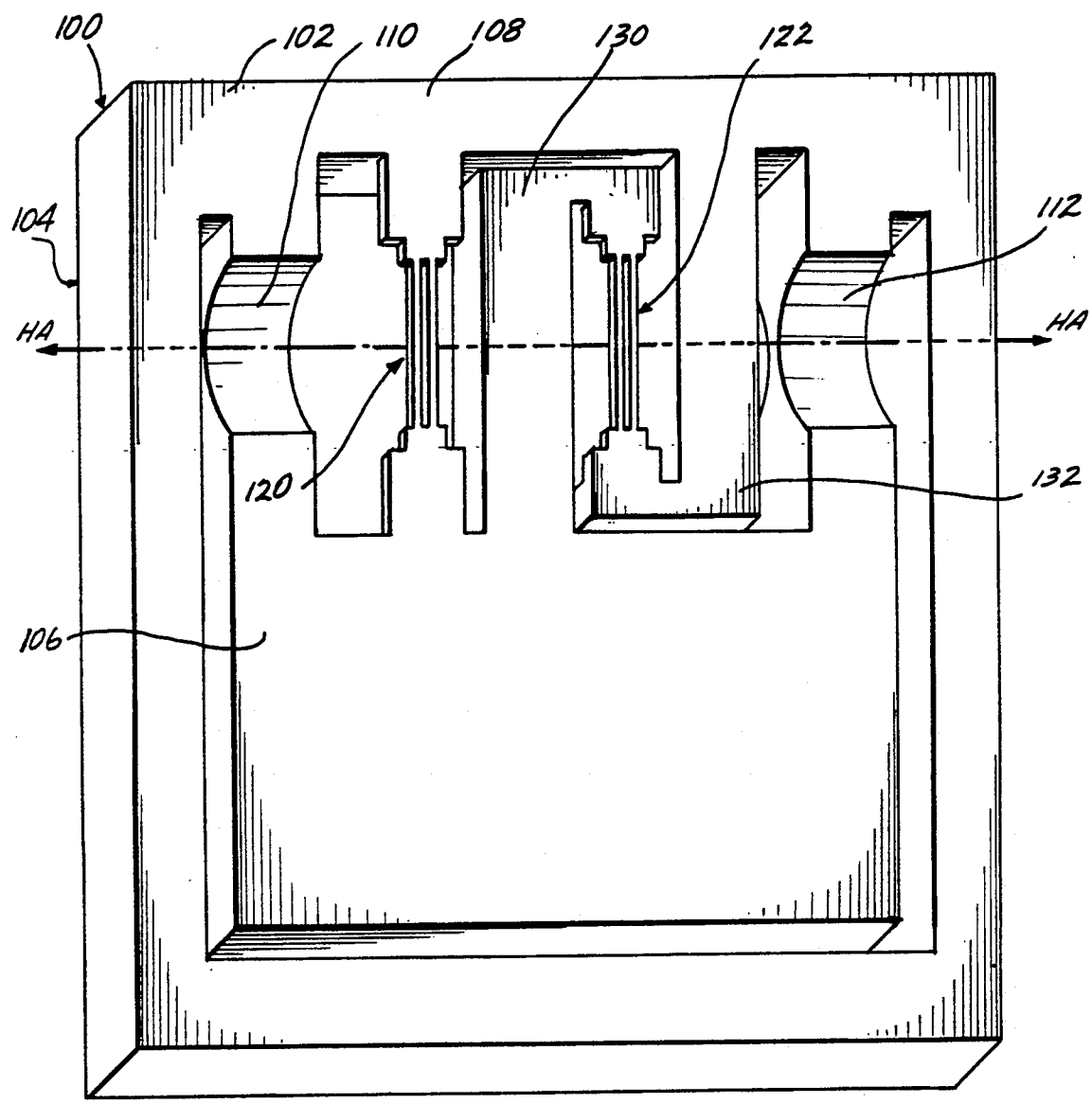
FIG. 4 is a schematic perspective view of a third preferred embodiment of the invention.

A third preferred embodiment of the invention is shown in FIG. 4. This embodiment includes silicon wafer 100 having upper surface 102 and lower surface 104, etched to form proof mass 106 connected to support 108 by flexures 110 and 112. Force transducers 120 and 122 extend between proof mass 106 and support 108. Flexures 110 and 112 have the shape of circular arc flexures, such that the proof mass rotates with respect to the support about a hinge axis HA that is positioned approximately midway between upper surface 102 and lower surface 104.

Force transducers 120 and 122 are both formed at upper surface 102 of wafer 100. Force transducer 120 extends directly between support 108 and proof mass 106, spanning hinge axis HA. Force transducer 122 also spans the hinge axis, and is connected between arm 130 extending from proof mass 106, and arm 132 extending from support 108. As a result, the force transducers extend in opposite directions from their connection points to the support towards their connection points to proof mass 106, resulting in a push-pull arrangement. Transducers 120 and 122 are preferably centered between flexures 110 and 112. Such an arrangement reduces sensitivity to hinge axis accelerations, because the transducers are clustered near the neutral bonding axis. This design also provides efficient utilization of space. The section of the proof mass near the flexures adds very little to the total moment of inertia of the proof mass, or to the damping of the proof mass. Arm 130 passing between force transducers 120 and 122 provides acoustic and electrical isolation, to minimize lock-in. The close spacing of transducers 120 and 122 simplifies the design for certain drive options, such as magnetic drive.

All the embodiments described above may utilize many forms of force transducers. Usable transducers include vibrating beam resonators as illustrated, piezoresistive strain gauges, piezoelectric transducers (e.g., zinc oxide coatings), and surface acoustic wave transducers. Vibrating beam transducers can use a variety of drive and position pickoff techniques. Usable techniques include magnetic, electrostatic, piezoelectric and piezoresistive pickoff, optical pickoff, resistive thermal expansion drive, and optical thermal expansion drive. In all embodiments, it is desirable to match the thermal coefficient of expansion of the transducers to the coefficient of expansion of the material from which the proof mass and support are fabricated, to minimize thermal strains on the transducers. This can be accomplished, in the silicon micromachined device, by controlling doping concentrations.

While the preferred embodiments of the invention have been illustrated and described, variations will be apparent to those skilled in the art. The scope of the invention is to be determined by reference to the following claims.

The embodiments of the invention in which an exclusive property or privilege is claimed are defined as follows:

1. In an accelerometer of the type comprising a support, a proof mass, flexure means connected between the support and the proof mass such that the flexure means mounts the proof mass for rotational movement with respect to the support about a hinge axis (HA) in response to acceleration along a sensitive axis, and first and second force transducers physically separate from the flexure means, each force transducer having opposite first and second ends and a longitudinal axis extending therebetween, each force transducer having its first end connected to the proof mass and its second end connected to the support, the force transducers being connected in a push-pull arrangement wherein for a given acceleration along the sensitive axis, one force transducer is subjected to a compression force along its respective longitudinal axis, and the other force transducer is subjected to a tension force along its respective longitudinal axis, the improvement wherein the transducers are positioned such that their longitudinal axes are located in a common plane that is approximately perpendicular to the sensitive axis, and wherein the hinge axis is normal to the sensitive axis and parallel to but spaced from the common plane.

2. The improvement of claim 1, wherein the proof mass includes a surface lying in said common plane.

3. The improvement of claim 1, wherein the longitudinal axes are parallel to one another, and approximately parallel to a pendulous axis that is normal to the hinge axis and to the sensitive axis and that passes through the hinge axis and a center of mass of the proof mass.

4. The improvement of claim 3, wherein the force transducers are spaced from one another along the hinge axis.

5. The improvement of claim 3, wherein the force transducers are positioned on opposite sides of the proof mass from one another.

6. The improvement of claim 4, wherein the flexure means comprises at least two flexures, and wherein the force transducers are positioned between the flexures.

7. The improvement of claim 6, wherein the proof mass includes a proof mass arm extending from the proof mass towards the support in a first direction along the pendulous axis, wherein the support includes a support arm extending from the support towards the proof mass in a second direction along the pendulous axis, the second direction being opposite to the first direction, and wherein one of the force transducers extends between the proof mass arm and the support arm.

8. The improvement of claim 7, wherein the proof mass arm is positioned between the force transducers.

9. The improvement of claim 4, wherein the longitudinal axis are positioned along a common line.

10. The improvement of claim 4, wherein the force transducers are spaced from one another along the pendulous axis.

11. The improvement of claim 1, wherein each force transducer comprises a vibrating beam force transducer.

12. The improvement of claim 11, wherein each force transducer is a double-ended tuning fork vibrating beam force transducer.

* * * * *